(12) United States Patent
Salgado

(10) Patent No.: US 6,587,233 B1
(45) Date of Patent: Jul. 1, 2003

(54) REMOVABLE BICOLORED PLATEN COVERS FOR IMAGE CAPTURE DEVICES

(75) Inventor: David L. Salgado, Victor, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/444,832

(22) Filed: Nov. 22, 1999

(51) Int. Cl.[7] .................. H04N 1/46; H04N 1/04
(52) U.S. Cl. ............. 358/505; 358/474; 358/497; 358/488; 358/486
(58) Field of Search ............. 358/488, 486, 358/497, 494, 400, 471, 474, 401, 501, 500, 505, 506; 399/380, 379

(56) References Cited

U.S. PATENT DOCUMENTS

| | | | | |
|---|---|---|---|---|
| 5,790,211 A | * | 8/1998 | Seachman et al. | 349/3 |
| 5,812,285 A | * | 9/1998 | Lin et al. | 358/497 |
| 6,208,438 B1 | * | 3/2001 | Watanabe et al. | 358/488 |
| 6,219,158 B1 | * | 4/2001 | Dawe | 358/509 |
| 6,327,058 B1 | * | 12/2001 | Webb et al. | 358/497 |

\* cited by examiner

Primary Examiner—Cheukfan Lee
(74) Attorney, Agent, or Firm—Oliff & Berridge, PLC

(57) ABSTRACT

A platen cover having a plurality of platen cover surfaces that can be exposed. Each platen cover surface has a different color and/or has a different surface treatment, such as matte, gloss, reflective and the like. The different exposable surfaces are carried on at least one removable platen cover surface that can be detachably attached to the platen cover. To change the exposed surface, the platen cover surface is detached from the platen cover. That platen cover surface can then be rotated to expose a different face of the platen cover surface. Alternately, a different platen cover surface can be installed. In other exemplary embodiments, the platen cover has a plurality of retractable platen cover layers that can be exposed. Each platen cover layer has a different color and/or surface treatment. The quality of many functions that are performed in an image capture device can be improved by using different platen cover colors. Therefore, the platen cover is selected based on the operation being performed or a image capture device user's selection.

16 Claims, 3 Drawing Sheets

FIG. 3
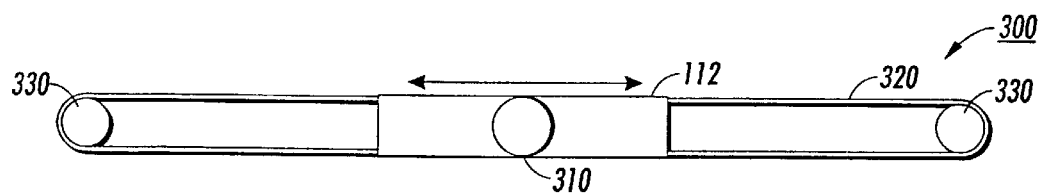
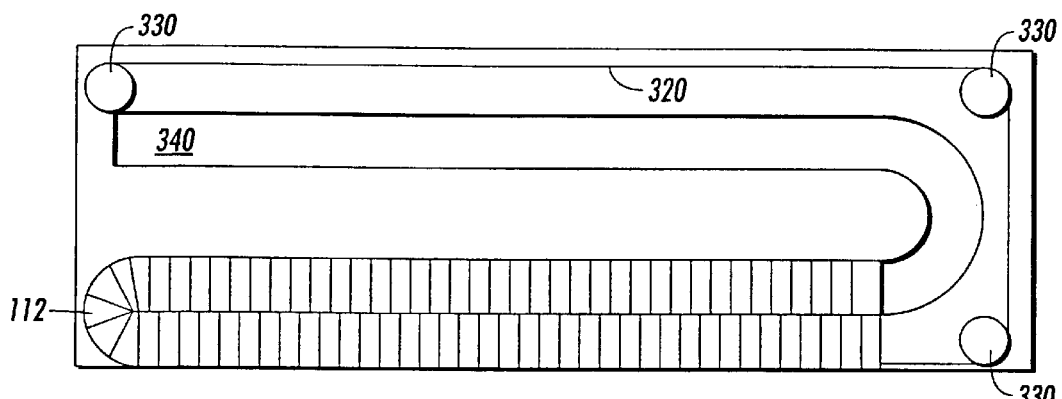
FIG. 4
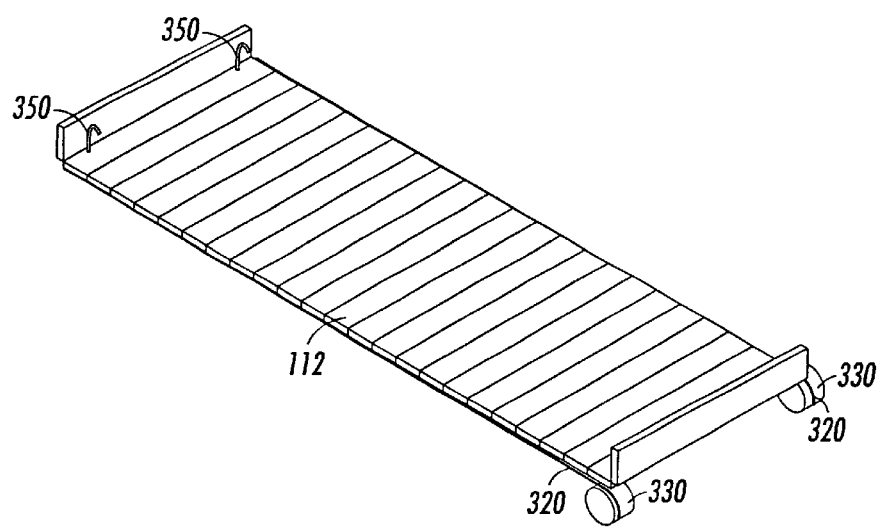
FIG. 5

REMOVABLE BICOLORED PLATEN COVERS FOR IMAGE CAPTURE DEVICES

BACKGROUND OF THE INVENTION

1. Field of Invention

This invention is related to platen covers and their use in image capture devices.

2. Description of Related Art

Image capture devices read information from an original image to generate electronic data representing the captured original image. The original image is placed on a transparent platen. The transparent platen is covered by a platen cover. Light, from a light source, traverses through the transparent platen and onto the original image. The light reflections and intensities contain information about the original image. This light is usually focused onto the surface of a photosensitive element. There, the light is turned into electrical signals. These signals are then output to a storage device or to an image generating system or device.

SUMMARY OF THE INVENTION

During the operation of copiers and other image capture devices, a document is laid on or fed onto a transparent platen and is covered by a platen cover. The platen cover aides in retaining the position of the document on the transparent platen. When copying large or thick documents, such as a book, the platen cover helps to prevent the rays of light from striking the operators' eyes. The platen cover is also used to aid in capturing information, particularly scan and image quality features. These include aiding in determining paper boundaries and size, in background suppression and in photo screening, to detecting colors. Using a different color and/or a different surface for the platen cover can improve each of these scan and image quality features. However, most copiers and other image capture devices only provide a platen cover using a single color, which is usually white.

This invention provides image capturing systems and methods that improve the quality of certain features that are platen-cover dependent.

This invention separately provides image capturing systems and methods that provide a removable platen cover that allows different platen cover colors and/or surfaces to be used.

This invention separately provides image capturing systems and methods that provide a set of one or more retractable platen covers, each having a different color and/or surface.

This invention separately provides systems and methods that automatically change the platen cover and/or surface based on the selected image capture operations.

In various exemplary embodiments of the systems and methods according to this invention, platen covers of various colors and/or surfaces are provided that correspond to the various scan and image quality features that can be obtained. For example, document size determination works best with a gray platen cover, automatic background suppression and photo screening work best with a white cover, and detecting colors, works best with mirrored surface covers.

In various exemplary embodiments of the systems and methods according to this invention, a removable snap-on platen cover is used to change the platen cover to a desired color and/or surface. The platen cover has different unchangeable colors and/or surfaces on each side. If it is desirable to provide more than two colors and/or surfaces, several interchangeable platen covers that corresponds to the various desired colors and/or surfaces can be provided. In various exemplary embodiments, during an image capture operation, the system can inform the operator of the appropriate platen color and/or surface for that operation. If that platen cover is not already installed, the operator can then easily and quickly change to the appropriate platen cover.

In other exemplary embodiments of the systems and methods according to this invention, one or more retractable platen covers is used. Each retractable platen cover has a different color and/or surface. The system chooses which platen cover to put in place based on the operation being performed or a user selection.

These and other features and advantages of this invention are described in or are apparent from the following detailed description of the apparatus/systems and methods according to this invention.

BRIEF DESCRIPTION OF THE DRAWINGS

Various exemplary embodiments of this invention will be described in detail, with reference to the following figures, wherein:

FIG. 3 illustrates a mechanical device that retracts the platen covers;

FIG. 4 illustrates another mechanical device that retracts the platen covers;

FIG. 5 illustrates a third mechanical device that retracts the platen covers.

DETAILED DESCRIPTION OF PREFERRED EMBODIMENTS

Figure 1:
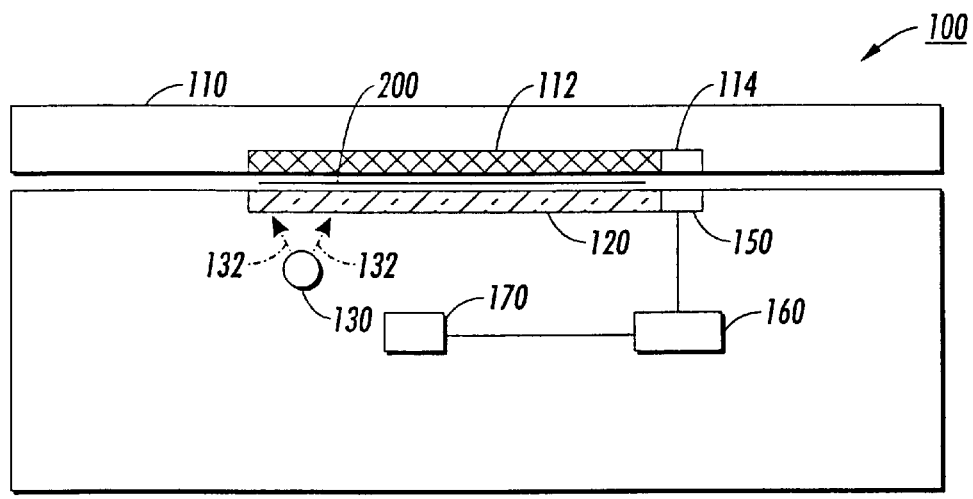
FIG. 1 illustrates an image capture device according to this invention.

FIG. 1 shows an image capture device 100 that includes a light source 130 used to illuminate an original image 200 through a transparent platen 120. When the image capture device 100 is in operation, a platen cover 110 having a changeable platen cover surface 112 is usually laid over the original image 200 after the original image 200 is placed upon the transparent platen 120. An operator provides a control signal to a controller 160 of the image capture device 100 to choose an image capture function to be performed on the original image 200. Light 132 from the light source 130 illuminates the platen cover surface 112 and the original image 200. The resulting reflections from the platen cover surface 112 and the original image 200 are directed towards a photosensitive array 170. The photosensitive array can be a CCD array, an array of photodiodes, a photo receptor or any other known or later developed device for generating electronic image data from the light reflected from the platen cover surface 112 and the original image 200. The image signals generated by the photosensitive array are then output to an image data sink. Alternatively, the photosensitive array can be replaced with a photosensitive member, such as a photoreceptor belt or drum.

Figure 2:
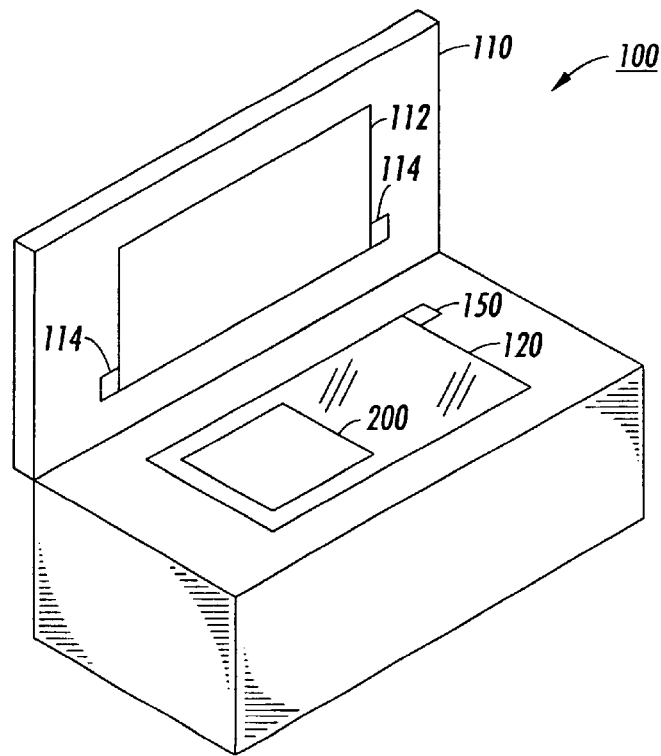
FIG. 2 illustrates a top view of the image capture device of FIG. 1 with the cover in an open position.

FIG. 2 shows a top view of the image capture device 100. The platen cover 110 is opened to reveal the platen cover surface 112, the original image 200 and the transparent platen 120.

In various exemplary embodiments of the image capture device 100 according to this invention, the platen cover surface 112 is removable. The platen cover surface 112 can be easily removed and snapped back into place. When the image capture device 100 informs the operator that a certain platen cover color is desirable, the operator can easily remove the current platen cover surface 112 having one color and/or surface and replace it with another platen cover surface 112 having a different color and/or surface. Each platen cover surface 112 has two exposable platen cover surfaces, each exposable platen cover surfaces having a different color and/or surface. In some instances it is only necessary to remove the current platen cover surface 112 and flip this platen cover surface 112 over to expose the other exposable platen cover surface. If more than two colors and/or surfaces are desirable to provide appropriate colors and/or surfaces for a larger number of image capturing functions, then several platen covers surfaces 112 can be provided. Each platen cover surface 112 has at least two exposable platen cover surfaces, with a different color and/or surface on each exposable platen cover surface.

In operating the image capture device 100, an operator chooses a specific image capture function that the operator wishes to perform on the original image 200. A controller 160 of the image capture device 100 will then determine or select which platen cover color and/or surface of those provided in the image capture device 100 is appropriately usable with that specified function.

In various exemplary embodiments, the image capture device 100 then informs the user, through a display system or the like, of the determined platen cover color and/or surface. The image capture device 100 then enters a waiting mode. The operator can then choose to change the platen cover color and/or surface or to continue operating the image capture device 100 with the current platen cover surface 112. If the determined platen cover color and/or surface is already the exposed platen cover surface 112, the user can input a control signal to advise the controller 160 of the image capture device 100 that the determined platen cover is the exposed color and/or surface of the platen cover surface 112. If the user chooses to change the platen cover surface 112, the user opens the platen cover 110, changes the platen cover surface 112 to expose the platen cover surface 112 of the platen cover 110 having the determined color and/or surface. The user then re-closes the platen cover 110 and inputs the control signal to advise the controller 160 of the image capture device 110 that the exposed color and/or surface 112 of the platen cover 110 is the determined platen cover color and/or surface. The image capture device 100 then performs the selected image capture operation.

In various other exemplary embodiments, each exposable surface 112 of the platen cover 110 is provided with a "keying" device or structure 114 that cooperates with a sensing device or structure 150. The sensing device or structure 150, based on the keying device or structure 114 of the exposed 112 surface of the platen cover 110, outputs a signal to the controller 160 of image capture device 100. This signal informs the controller 160 of the image capture device 100 of the currently exposed surface 112 of the platen cover 110. If the platen cover surface 112 corresponding to the determined color and/or surface is already in place, then the image capture device 100 proceeds to perform the selected function. If another platen cover 110 is more appropriate for the selected function, then the image capture device 100 will inform the operator, through a display system or the like, of the particular platen cover 110 that is appropriate for the selected operation. The operator can then choose to change the platen cover color and/or surface or to continue operating the image capture device 100 with the current platen cover surface 112.

If the operator chooses to change the platen cover surface 112, the operator opens the platen cover 110, changes the platen cover surface 112 to expose the surface 112 of the platen cover 110 having the determined color and/or surface. Once the operator re-closes the platen cover 110, the controller 160 inputs the signal from the sensor device or structure 150. The image capture device 100 will then inform the operator if the correct platen cover color and/or surface 112 has been exposed. If it is the correct platen cover color and/or surface 112, then the image capture device 100 will proceed with the selected function. If the exposed platen cover and/or surface 112 is the incorrect platen cover color and/or surface 112, then the operator has the option of changing the platen cover color and/or surface 112 or using the exposed platen cover and/or surface 112 already installed.

Once the image capture device 100 has performed the selected function, the operator can then choose to leave the platen cover color and/or surface 112 as is or replace it, so the image capture device 100 is in its original state. In this case, the image capture device 100 is then ready to be used by another operator.

In other exemplary embodiments of the image capture device according to this invention, the platen cover 110 has one or more retractable layers that form the platen cover surfaces 112. That is, the platen cover 110 contains several layers of platen covers surfaces 112. Each such platen cover layer 112 contains a different color and/or surface. When an operator chooses a specific function, the controller 160 of the image capture device 100 decides which platen cover color and/or surface 112 to use, based on the selected function 100. One or more of the platen cover layers 112 are retracted or extended until the platen cover layer 112 having the desired color and/or surface is exposed. This requires little involvement by the operator.

Using the image capture device 100 that uses different platen covers surfaces 112 or platen cover layers 112 that have different colors and/or surfaces improves the quality of certain features that are platen-cover dependent. This allows for greater versatility in operating the image capture system 100. Using the snap-on or retractable platen cover surfaces 112 according to the various different exemplary embodiments of the invention makes it possible to perform the platen-cover-dependent functions in an easy manner.

The removable platen cover surfaces 112 according to this invention can be removed and snapped into place using various mechanical, electrical or magnetic connecting structures or devices. When using snap-on-type platen cover surfaces 112, a magnet or electromagnet can be used to snap and remove the platen cover surfaces 112 easily into place. Alternatively, mechanical flanges can extend from the platen cover 110, where the platen cover surfaces 112 can be securely placed between the flanges. It should be appreciated that any other known or later developed mechanical, magnetic and/or electrical connection structures or devices can be also used.

The retracting platen cover layers 112 can use various electrical and mechanical devices to retract and extend the retractable platen cover layers 112. FIG. 3 shows one of many mechanical structures usable to retract the platen cover layers 112. Each platen cover layer 112 is retracted by pulley system 300. The platen cover layer 112 is attached to a cable 320 by an attachment structure 310. The cable 320 is attached to the top of the attachment structure 310. The cable 320 slides along the bottom of the attachment structure 310. When the platen cover layer 112 is retracted, the appropriate pulley turns to retract the platen cover layer 112. When the platen cover layer 112 is placed back into its extended position, the other pulley turns, bringing the platen cover layer 112 back to this position. A similar retraction system can be used or provided for each such retractable platen cover layer 112.

FIGS. 4 and 5 show two other exemplary embodiments of a retraction system usable to retract the platen covers. The platen cover surface 112 shown in FIG. 4, are attached to a pulley cable 320. When the bottom platen cover surface 112 is retracted, the pulleys 330 turn to pull the platen cover surface 112 around the track 340, exposing the platen cover surface 112 above it. In the exemplary embodiment shown in FIG. 5, a hook 350 is used to hold the platen cover surface 112 in place. When the platen cover is retracted, the hooks 350 release and the pulleys 330 turn and pull the screen to the left, exposing the platen cover surface 112 above.

Figure 6:
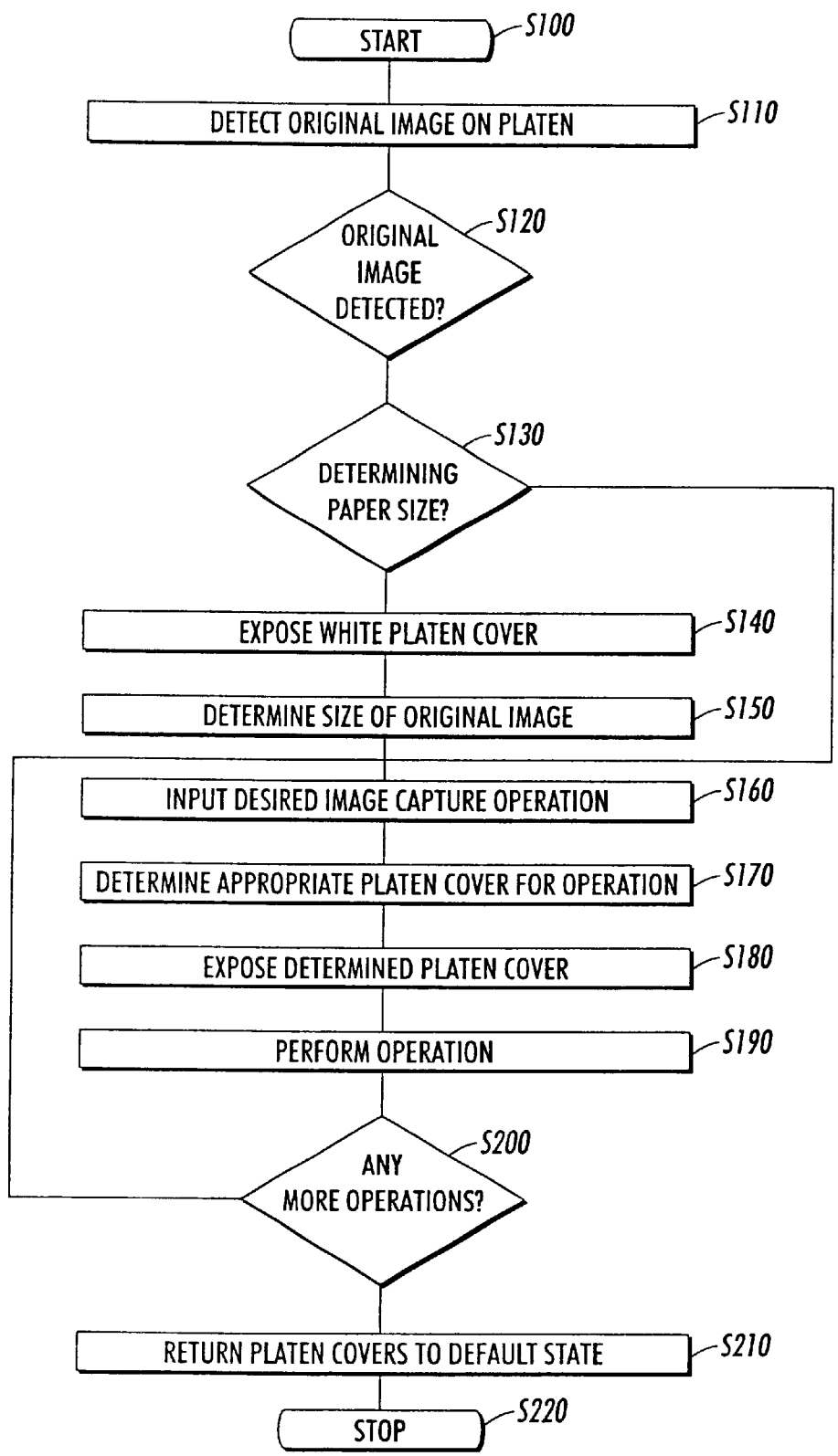
FIG. 6 is a flowchart outlining one exemplary embodiment of a method for using retractable platen covers according to this invention.

FIG. 6 is a flowchart outlining one exemplary embodiment of a method for using the retractable platen cover surface according to this invention. Beginning in step S100, control continues to step S110, where the presence of an original image on a platen of an image capture device is detected. Then, in step S120, a determination is made whether an original image has been detected. If not, control jumps back to step S110. Otherwise, if an original image is detected, control continues to step S130.

In step S130, a determination is made whether the paper size is to be determined. If so, control continues to step S140. Otherwise, control jumps directly to step S160.

In step S140, a white platen cover layer is exposed. Then, in step S150, the size of the original image on the platen is determined using the exposed white platen cover.

In step S160, the image capture operation desired by the user is input. Then, in step S170, the appropriate platen cover for the desired image capture operation is determined from the set of available platen cover layers. Next, in step S180, the determined platen cover layer is exposed by either retracting the platen cover layers that are between the determined platen cover layer and the platen or by extending the determined platen cover layer and any retracted platen cover layers that are on the other side of the determined platen cover layer from the platen. Then, in step S190, the input image capture operation is performed using the exposed platen cover layer. Control then continues to step S200.

In step S200, a determination is made whether any more image capture operations are to be performed on the current original image placed on the platen. If so, control jumps back to step S160. Otherwise, control continues to step S210. In step S210, the platen covers are returned to their default extended or retracted states. Then, in step S220, the image capture process ends.

While FIG. 1 shows the image capture device 100 as a separate device from an image data sink, the image capture device 100 may be an integrated device, such as an analog copier, a digital copier, a computer with a built-in scanner, a facsimile machine, or any other integrated device that is capable of producing electronic image data or an electrostatic latent image from an original image. With such a configuration, for example the image capture device 100 and data sink may be contained within a single device. Alternatively, the image capture device 100 may be a separate device attachable upstream of a stand alone image data sink. For example, the image capture device 100 may be a device which interfaces with the image data sink.

In general, the image capture device 100 can be any one of a number of different types of devices, such as a scanner, an analog copier, a digital copier, or a facsimile device that is suitable for generating electronic image data. Thus, the image capture device 100 can be any known or later developed device that is capable of generating image data or an electrostatic latent image by illuminating an original image. In general, the image data sink can be any device that is capable of processing or storing the generates image data generated according to the systems and methods of this invention, such as a printer, a copier or other image forming devices, a facsimile device, a display device, a memory, or the like.

While this invention has been described in conjunction with the exemplary embodiments outlined above, it is evident that many alternatives, modifications and variations will be apparent to those skilled in the art. Accordingly, the exemplary embodiments of the invention may be made without departing from the spirit and scope of the invention.

What is claimed is:

1. An image capture device that generates electronic image data from an original image, comprising:
   a transparent platen, the original image placeable on the transparent platen;
   a changeable platen cover having at least two surfaces that can be exposed, each surface having a different combination of color and surface treatment;
   a light source; and
   an imaging device.

2. The image capture device according to claim 1, wherein the changeable platen cover is removable.

3. The image capture device according to claim 1, wherein the image capture device informs the user of an appropriate changeable platen cover surface that corresponds to an image capture function selected by the user.

4. The image capture device according to claim 1, wherein the changeable platen cover is attached to the image capture device by a mechanical attachment structure.

5. The image capture device according to claim 1, wherein the changeable platen cover is attached to the image capture device by at least one of at least one electromagnet and at least one permanent magnet.

6. The image capture device according to claim 1, wherein the changeable platen cover is retractable.

7. The image capture device according to claim 1, wherein the changeable platen cover is retracted using a pulley system.

8. A method for changing a platen cover surface of a changeable platen cover having at least two surfaces that can be exposed, each surface having a different combination of color and surface treatment, according to a desired operation of an image capture device, including:
   determining the desired operation of the image capture device;
   determining an appropriate one of the at least two surfaces based on the desired operation; and
   changing the changeable platen cover to expose the determined surface.

9. The method of claim 8, wherein changing the exposed surface of the changeable platen cover comprises removing the platen cover surface from the platen cover;
   selecting a different platen cover surface; and
   reattaching the determined platen cover surface to the platen cover.

10. The method of claim 8, further comprising attaching the changeable platen cover to the image capture device using at least one mechanical connection device.

11. The method of claim 8, further comprising attaching the changeable platen cover to the image capture device using at least one of at least one electromagnet and at least one permanent magnet.

12. The method of claim 8, wherein changing the changeable platen cover comprises at least one of retracting at least one retractable platen cover layer and extending at least one retractable platen cover layer.

13. The method of claim 8, wherein retracting and extending the at least one retractable platen cover layer comprises retracting and extending the at least one platen cover layer using a pulley system.

14. A method for automatically changing a platen cover color and/or surface of a changeable platen cover having at least two surfaces that can be exposed, each surface having a different combination of color and surface treatment, according to a desired operation of an image capture device, including:

determining the desired operation of the image capture device;

determining an appropriate one of the at least two surfaces based on the desired operation; and automatically changing the changeable platen cover to expose the determined surface.

15. The method of claim 14, further comprising, if another desired operation is to be performed:

determining an appropriate one of the at least two surfaces based on the another desired operation; and changing automatically the changeable platen cover to expose the determined surface.

16. The method of claim 14, further comprising automatically returning the changeable platen cover to a default state after the desired operation is performed.

* * * * *